United States Patent [19]
Manning

[11] 3,794,374
[45] Feb. 26, 1974

[54] TRANSIT VEHICLE BODY MODULE

[75] Inventor: Donald Lee Manning, Orchard Lake, Mich.

[73] Assignee: General Motors Corporation, Detroit, Mich.

[22] Filed: June 5, 1972

[21] Appl. No.: 259,599

[52] U.S. Cl.............. 296/28 A, 105/238, 105/329
[51] Int. Cl............................................. B62d 31/02
[58] Field of Search .... 296/28 A, 28 K, 31 R, 31 P; 105/329, 397

[56] References Cited
UNITED STATES PATENTS
1,621,675   3/1927   Masury ............................ 296/28 A FOREIGN PATENTS OR APPLICATIONS
469,417   12/1928   Germany ........................... 296/28 A
597,966    2/1948   Great Britain .................... 296/28 A

*Primary Examiner*—David Schonberg
*Assistant Examiner*—John A. Pekar
*Attorney, Agent, or Firm*—Herbert Furman

[57] ABSTRACT

A body module for a transit vehicle includes a pair of U-shaped carlines which open downwardly. The legs of each are interconnected transversely extending bulkhead structures. The carlines are connected in longitudinally spaced relation by side-wall structures including upper and lower side panels extending between the longitudinally aligned legs of the carlines. The carlines are joined at their upper portions by a roof structure including inner and outer roof panels extending therebetween and welded thereto. The floor of the passenger compartment is mounted on supports extending between the upper edges of the bulkhead structures. A plurality of the body modules are aligned longitudinally and welded end to end to provide the transit vehicle body. The sidewall structures and the roof structure provide the integral longitudinal stress sustaining frame structure of the vehicle. The sidewall structures are located above the floor line of the passenger compartment and accordingly do not obstruct the space beneath the passenger compartment floor which is used for the storage of passenger luggage, fuel tanks and electric storage batteries.

3 Claims, 1 Drawing Figure

PATENTED FEB 26 1974  3,794,374
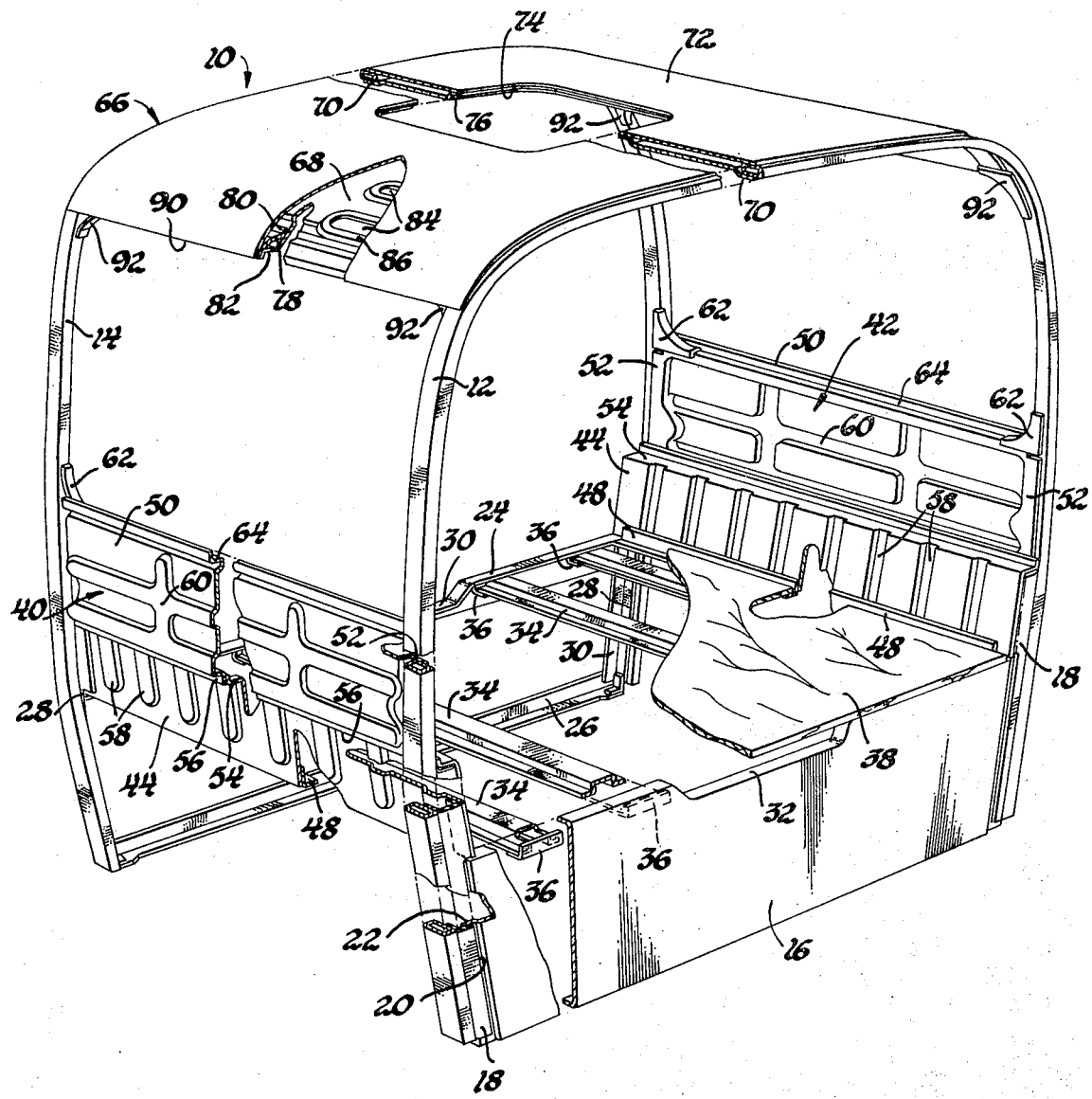

TRANSIT VEHICLE BODY MODULE

The invention relates to a vehicle body module and more particularly to a body module which may be joined with like modules to provide a transit vehicle body.

It is known to provide a vehicle with integral body and chassis construction comprised of identical separately manufactured elements or modules which are assembled to form the vehicle.

It is also known to provide such a vehicle body module having a separate frame or base structure which is located beneath the floor of the module and extends substantially the full length of the vehicle body.

It is desirable in vehicle bodies and particularly in transit vehicle bodies such as motor busses to have the vehicle floor as close as possible to the roadway in order to minimize the number of steps which the passenger must climb to enter the vehicle. At the same time it is necessary in such transit vehicles to provide sufficient space beneath the vehicle floor for storage of passenger luggage as well as accomodation of vital operating components of the vehicle such as electrical storage batteries and fuel tanks. It is also necessary to obtain these objectives and have the necessary undercarriage clearance between the roadway and the vehicle body.

The present invention fulfills these objectives by providing a vehicle body module in which longitudinally extending stress sustaining structural members are located in the sidewall structures of the module and generally above the floor line of the vehicle. The transversely extending stress sustaining structural members of the vehicle body module are provided by bulkhead structures extending transversely of the module at its fore and aft ends and beneath the vehicle floor. The bulkheads cooperate with the vehicle floor to define an underfloor compartment of sufficient height to accomodate passenger luggage, electric storage batteries, and fuel tanks, and still have the necessary clearance between the body and the roadway and a minimum floor height.

A vehicle body module according to the invention comprises a pair of longitudinally spaced U-shaped carlines which open downwardly and the legs of each are connected by transversely extending bulkhead structures. The carlines of the module are connected in longitudinally spaced relation by sidewall structures including upper and lower side panels extending between the carlines and having stamped stiffening ribs therein to provide increased strength. The carlines are joined at their upper portions by a roof structure including inner and outer roof panels extending therebetween and welded thereto.

A plurality of low-profile hat-section floor supports extend between the bulkhead structures at their upper edge portions to support the floor or the passenger compartment.

The lower side panel of the sidewall structure is located above the vehicle floor and thereby does not obstruct the space beneath the passenger compartment floor which is used for luggage storage and vehicle components.

A plurality of body modules so constructed may be aligned longitudinally and welded together to provide a vehicle body of desired length.

The single drawing is a perspective view of a vehicle body module according to the invention having parts broken away and in section.

Referring to the drawing, a body module 10 according to the invention is shown and includes identical U-shaped downwardly opening carlines 12 and 14 having laterally spaced legs. The carlines are of rectangular tubular construction to provide high strength and low weight. The carlines 12 and 14 are longitudinally spaced and respectively define the fore and aft end portions of the module 10.

A stamped bulkhead structure 16 extends transversely of the module 10, between the lower portions of the laterally spaced legs of carline 12. Generally U-shaped filler panels 18 each have an outboard leg welded to a respective carline leg. The inboard leg of each filler panel is cut-away at 20 so that the offset ends 22 of the bulkhead may extend therewithin and be welded to the bight thereof. It will be apparent that the filler panels 18 may be eliminated from the construction by simply utilizing a bulkhead 16 of extended length and having flanged ends welded directly to the legs of the carline 12.

The bulkhead structure for carline 14 includes angle members 24 and 26 which extend transversely of the module 10 between the lower portion of the legs of carline 14. Generally U-shaped filler panels 28 each have an outboard leg welded to a respective carline leg. The inboard leg of each filler panel is cut-away at 30 and has the ends of the respective angle member 24 or 26 welded thereto. The upper flanged edge of bulkhead 16 and the upper leg of angle member 24 are depressed at 32 to provide a longitudinal passage through the module 10.

The floor structure of the vehicle body includes a plurality of low profile hat-section floor supports 34 extending longitudinally between the upper bulkhead 16 and the angle member 24. The ends of supports 34 seat on angle brackets 36 secured to the bulkhead structure 16 and member 24 and engage and are welded to the upper flanged edge of the bulkhead and the upper leg of member 24. The floor panel 38 which may be of plywood, extends between the bulkhead 16 and angle member 24 and is supported in part by the floor supports 34.

Identical right and left hand sidewall structures indicated generally at 40 and 42 extend between the carlines 12 and 14 and provide the lower longitudinal stress sustaining structure of the module 10. Only the right hand wall structure 40 will be particularly described. This structure includes a lower side panel 44 which extends longitudinally between carlines 12 and 14 and seats on the upper flanged edge of bulkhead 16 and the upper leg of angle member 24. One end of the lower side panel is attached by welding to the inboard leg of filler panel 18 and the other end is likewise welded to the inboard leg of filler panel 28. A floor support or angle member 48 extends longitudinally between the upper flanged edge of bulkhead 16 and the upper leg of angle member 24 and is attached by welding to the lower side panel 38 to provide support for the side edge portion of the floor panel 38.

The wall structure 40 also includes an upper side panel 50 extending longitudinally between the carlines 12 and 14 and having its offset ends 52 attached thereto by welding. An off-set flange 54 of lower side panel 44 and an offset flange 56 of upper side panel 50 are welded together. Flange 54 overlies and closes the end filler panels 18 and 28. Stamped stiffening ribs 58 in the lower side panel 44 and stamped stiffening ribs 60 in the upper side panel 50 impart additional strength to the sidewall structure 40. Filler braces 62 are welded to the carlines 12 and 14 to the upper offset flanged edge 64 of panel 50 to increase the strength of sidewall structure 40.

A roof structure indicated generally at 66 extends between the carlines 12 and 14 and includes an inner roof panel 68 having its offset flanged ends 70 attached by welding to the inner face of the carlines 12 and 14 and an outer roof panel 72 attached by welding to the outer face of the carlines 12 and 14. An access opening 74 is provided in the roof structure 66 by pinchwelding an offset flange 76 of the inner panel to the outer panel around the perimeter of the opening. A flanged inner side rail member 78 extends between the carlines 12 and 14 and has one flange 80 thereof welded to the inner panel 68. The other flange of member 78 and an offset flange 82 of the inner panel are pinchwelded to the outer panel to provide the roofrails of the module. A plurality of offset openings 84 in the inner panel have their flanges 86 conventionally bonded by adhesive to the outer panel 72.

A window opening 90 is defined by the flange 64 of panel 50, carlines 12 and 14 and the pinchweld of roof structure 66. Reinforcing corner brackets 92 are welded to the carlines and to the inner panel 68 of the roof structure at the upper corners of the window opening 90 and cooperate with filler braces 62 in reinforcing the opening and the strength of the module.

The transit vehicle body is assembled by aligning a plurality of the body modules 10 and welding them together end to end at their fore and aft edge portions. The transit vehicle body also includes a front suspension module and a driver module, as well as a rear suspension module and engine module, not shown, to provide the complete transit vehicle body.

Thus a vehicle body is provided in which the longitudinally extending stress sustaining structural members are located above the floor line of the vehicle, thereby providing an under floor compartment space of necessary height while permitting a minimum passenger compartment floor height and sufficient vehicle undercarriage clearance.

What is claimed is:

1. A body module for a vehicle body comprising; first and second downwardly opening U-shaped carlines having laterally spaced legs, first transversely extending bulkhead means attached in connection between the legs of the first carline, second transversely extending bulkhead means attached in connection between the legs of the second carline, floor support means extending between the bulkhead means at substantially the upper edge portions thereof, longitudinally extending sidewall structures connecting the carlines in longitudinally spaced relation and having their lower edge portions at an elevation substantially the same as that of the floor support means, and a roof structure connecting the pair of carlines at their upper portions to provide an integral body and frame structure having a compartment space beneath the floor structure supporting means, and between the first and second bulkhead means.

2. A body module for a vehicle body comprising; first and second downwardly opening U-shaped carlines having laterally spaced legs, first transversely extending bulkhead means attached in connection between the legs of the first carline, second transversely extending bulkhead menas attached in connection between the legs of the second carline, a plurality of low profile members extending between the bulkheads at substantially the upper edge portions thereof, passenger compartment floor panel means mounted on the plurality of low profile members, longitudinally extending sidewall structures connecting the carlines in longitudinally spaced relation and having their lower edge portions at an elevation substantially the same as that of low profile members, means on the sidewall structures supporting the side edge portions of the floor panel means, and a roof structure connecting the pair of carlines at their upper portions, the roof structure including inner and outer roof panels and having an access opening located centrally therein, the floor panel means and first and second bulkhead means defining a compartment space beneath the passenger compartment floor panel means.

3. A body module for a vehicle body comprising: first and second downwardly opening U-shaped carlines having laterally spaced legs, a first transversely extending bulkhead means attached in connection between the legs of the first carline, a second transversely extending bulkhead means attached in connection between the legs of the second carline, longitudinally extending sidewall structures connecting the first and second carlines in longitudinally spaced relation, a roof structure connecting the first and second carlines at their upper portions, floor means extending longitudinally between the first and second bulkhead means and transversely between the sidewall structure to define a passenger compartment in cooperation with the roof structure, the first and second transversely extending bulkhead means being generally beneath the floor means and cooperating with the floor means to provide a compartment space beneath the floor means and between the first and second bulkhead means, the lower edge portions of the sidewall structures being at an elevation substantially the same as the floor means to permit access to the compartment space.

* * * * *